(12) United States Patent
Barnard et al.

(10) Patent No.: US 7,339,777 B2
(45) Date of Patent: Mar. 4, 2008

(54) GROUNDING SYSTEM FOR A ROTATING SHAFT

(75) Inventors: Michael P. Barnard, Portland, ME (US); Adam H. Willwerth, North Yarmouth, ME (US); Jeffrey W. Richardson, Otisfield, ME (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/330,432

(22) Filed: Jan. 12, 2006

(65) Prior Publication Data

US 2007/0159763 A1 Jul. 12, 2007

(51) Int. Cl.
*H05F 3/02* (2006.01)
(52) U.S. Cl. ..................................... 361/212
(58) Field of Classification Search ............... 361/212
See application file for complete search history.

(56) References Cited

U.S. PATENT DOCUMENTS

| | | | | |
|---|---|---|---|---|
| 3,626,506 | A | * 12/1971 | Spieth | 403/31 |
| 5,069,415 | A | * 12/1991 | Mechalas | 248/674 |
| 5,085,373 | A | 2/1992 | Behr et al. | |
| 5,233,499 | A | * 8/1993 | Twerdochlib | 361/212 |
| 6,896,735 | B2 | 5/2005 | Giuliano et al. | |
| 2004/0135016 | A1 | 7/2004 | Baumann et al. | |
| 2004/0233592 | A1 | * 11/2004 | Oh et al. | 361/23 |

FOREIGN PATENT DOCUMENTS

EP 0796663 8/2001

\* cited by examiner

*Primary Examiner*—Michael Sherry
*Assistant Examiner*—Christopher J Clark
(74) *Attorney, Agent, or Firm*—Mark W. Croll; Paul F. Donovan (57) ABSTRACT

A system is provided for dissipating electrical charges that build on a rotatable shaft extending from an electrically-grounded motor housing or rotating shafts conductively linked to components that create and electrical charge, such as wind turbine blades, power generator turbines, and the like. The system includes a frame defining a central opening wherein the rotatable shaft is positioned with the central opening, a first grounding fiber secured within the frame, and a fiber clamp positioned with the frame. The fiber clamp acts to urge the first grounding fiber toward the central opening. The system may also include a mounting bracket having a frame mounting channel, wherein a portion of the frame is securely retained within the frame mounting channel, and an installation guide positioned on the mounting bracket. The installation guide may be configured to properly align the frame and the first grounding fiber relative to the rotatable motor shaft.

27 Claims, 9 Drawing Sheets

GROUNDING SYSTEM FOR A ROTATING SHAFT

FIELD OF THE INVENTION

Embodiments of the present invention generally relate to a grounding device for controlling shaft electrical current that is generated in AC motors controlled by variable speed drives or DC motors, and more particularly to a grounding ring apparatus for mitigating shaft electrical current. Additionally, embodiments of the present invention may be used in systems including rotating shafts conductively linked to components that create an electrical charge such as wind turbine blades, power generator turbines, and the like.

BACKGROUND OF THE INVENTION

Shaft induced electrical current is experienced in electrical motors, and is commonly experienced with three-phase motors driven by variable speed drives.

Variable speed drives utilize pulse width modulation technology to vary the speed of AC motors, thereby allowing use of less-expensive AC motors in applications where more expensive DC motors had been used previously. A drawback to the use of AC motors with variable speed drives is that higher common mode voltage (CMV) is generated by the variable speed drive that increases shaft induced currents.

Voltage on the motor shaft induces current flow through the shaft bearings to the motor frame and then to ground. While the motor is running, the bearings become more resistive to current flow, causing a buildup of charge on the shaft surfaces. Over a short period of time, the CMV causes electrical charges to build to a high level. As the electrical charges pass the threshold level of the least electrically resistant path, usually through the ball bearings on the shaft, an instantaneous burst or discharge of electrical energy passes through the bearing. This discharge causes electric discharge machining (EDM), which can damage the surfaces of the bearing races and the balls in the bearing. The electrical energy burst creates fusion craters, and particulate from the crater formation remains inside the sealed bearing. Both the fusion crater and the particulate material in the bearing act to disturb the free flow rotation of the bearing, which can lead to physical damage and premature bearing failure.

A number of mitigation technologies have been used in attempts to overcome this problem. Known attempts include using conductive bearing grease, insulating the bearings and using copper/phosphorus brushes and a Faraday shield. A common, somewhat cost-effective solution that has been used is to ground the shaft using spring-loaded copper brushes that provide a continuous flow of current to ground. Copper brushes, however, wear out quite rapidly and require frequent, periodic service and replacement. Additionally, oxide build-up on the shaft and other barriers between the brushes and the shaft reduce the current flow and cause a burst of electrical energy across the brush and shaft. Spring-loaded brushes also tend to vibrate due to alternating frictional stick/slip relationships between the brush and the shaft surface. Vibration of the brushes, from whatever cause, can result in undesirable sparking.

U.S. Patent Application Publication No. 2004/0233592, entitled "Grounding Brush For Mitigating Electrical Current On Motor Shafts," assigned to Illinois Tool Works, Inc., (the "'592 publication") discloses a grounding brush for mitigating static electric charge on a motor shaft. The grounding brush includes a plurality of filaments secured to an annular frame around the shaft, with the tips of the filaments disposed in a channel defined by the frame. The '592 publication overcomes many of the drawbacks of previous attempts to mitigate shaft electrical current.

The system disclosed in the '592 publication includes numerous individual filaments. When the system is mounted onto a motor shaft, proper alignment of the ring to the motor shaft depends only on the fiber filaments supporting the ring evenly around the shaft. With the exception of the fiber filaments, there is nothing to ensure that the filaments are properly aligned with respect to the motor shaft. In short, the filaments may be misaligned with respect to the motor shaft, thereby decreasing charge mitigation.

Thus, a need exists for an efficient grounding system that may be used effectively for a prolonged period of time, requiring minimal service or replacement.

SUMMARY OF THE INVENTION

Embodiments of the present invention provide a system for dissipating charges that build on a rotatable shaft extending from an electrically grounded motor housing, or rotating shafts conductively linked to components that create an electrical charge, such as wind turbine blades, power generator turbines, and the like. The system includes a frame defining a central opening for the rotatable shaft, a plurality of grounding fibers secured within the frame, a plurality of fiber clamps positioned with the frame, a plurality of mounting brackets having frame mounting channels, and a plurality of installation guides positioned on the plurality of mounting brackets.

The fiber clamps act to urge the plurality of grounding fibers toward the central opening. The mounting brackets are configured to securely mount to the electrically grounded motor housing, such as through screws and/or bolts, and portions of the frame are securely retained within the frame mounting channels.

The installation guides are configured to properly align the frame and the grounding fibers relative to the rotatable motor shaft. The installation guides are removed after the mounting brackets are securely mounted to the electrically grounded motor housing.

Each grounding fiber may be a contiguous piece of material wrapped within said frame to form a plurality of grounding rows. For example, each grounding fiber may be a loop of fiber or bundled fibers that is folded and wrapped within the frame, thereby forming multiple grounding rows of fiber material.

The frame may be a single annular frame. Alternatively, the frame may be a split frame having two prongs joined together, wherein the two prongs have free ends separated by an opening. Also, alternatively, the frame may be a split frame having two separated distinct frame members, and the free ends may be joined together by frame joints.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 1:
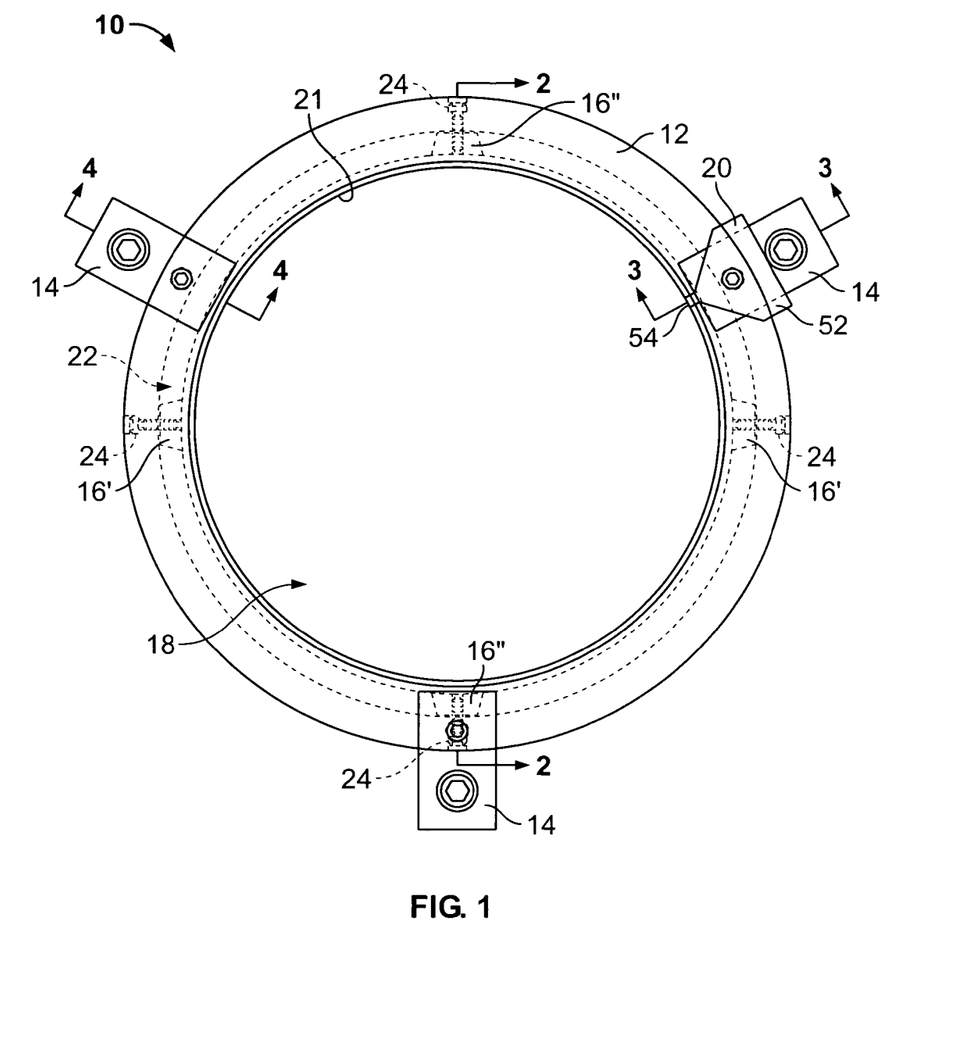
FIG. 1 illustrates a plan view of a charge-dissipating assembly, according to an embodiment of the present invention.

FIG. 1 illustrates a plan view of an electrical charge-dissipating assembly 10, according to an embodiment of the present invention. The assembly 10 includes an annular frame 12 housing a plurality of grounding fibers, or filaments, (not shown in FIG. 1), a plurality of mounting brackets 14 secured to the annular frame 12, and a plurality of wedge-shaped fiber clamps 16 positioned within the annular frame 12. The electrical charge-dissipating assembly 10 may be formed of metal, conductive plastic, or other electrically conductive materials. The electrical charge-dissipating assembly 10 is readily adaptable for use on motors of various sizes, having motor shafts of various diameters, and is operable to dissipate static and/or other such electrical charges that build on a motor shaft during operation of the motor.

The annular frame 12 includes a central opening 18 that defines a rotatable shaft passage, such as a motor shaft passage. The annular frame 12 is configured to be positioned around a rotatable shaft (not shown in FIG. 1) such that an inner diameter 21 of the annular frame 12 is proximate or contacts an outer diameter of the rotatable shaft, thereby allowing the rotatable shaft to rotate relative to the annular frame 12.

The mounting brackets 14 are configured to securely mount the electrical charge-dissipating assembly 10 to a portion of rotatable shaft and/or a motor housing, such as a motor faceplate (not shown in FIG. 1). The mounting brackets 14 mount to the stationary portion of the motor, while the annular frame 12 is secured around, not necessarily to, a rotatable shaft of the motor. While three mounting brackets 14 are shown, more or less than the number shown in FIG. 1 may be used. An installation guide 20 may be removably secured to each mounting bracket 14 in order to assist in properly aligning the grounding fibers around the rotatable shaft within the motor housing, as discussed below. While only one installation guide 20 is shown, the assembly 10 may use a separate installation guide 20 with respect to every mounting bracket 14.

The fiber clamps 16 include a clamping main body 22 movably secured within the annular frame 12 through a fastener 24, such as a screw. The fiber clamps 16 are configured to urge rows of grounding fibers toward or into the motor shaft. For example, the fasteners 24 are tightened to urge the fiber clamps 16 toward the motor shaft, in the direction of the inner diameter 21 of the annular frame, thereby moving the rows of grounding fibers in the same direction.

Figure 2:
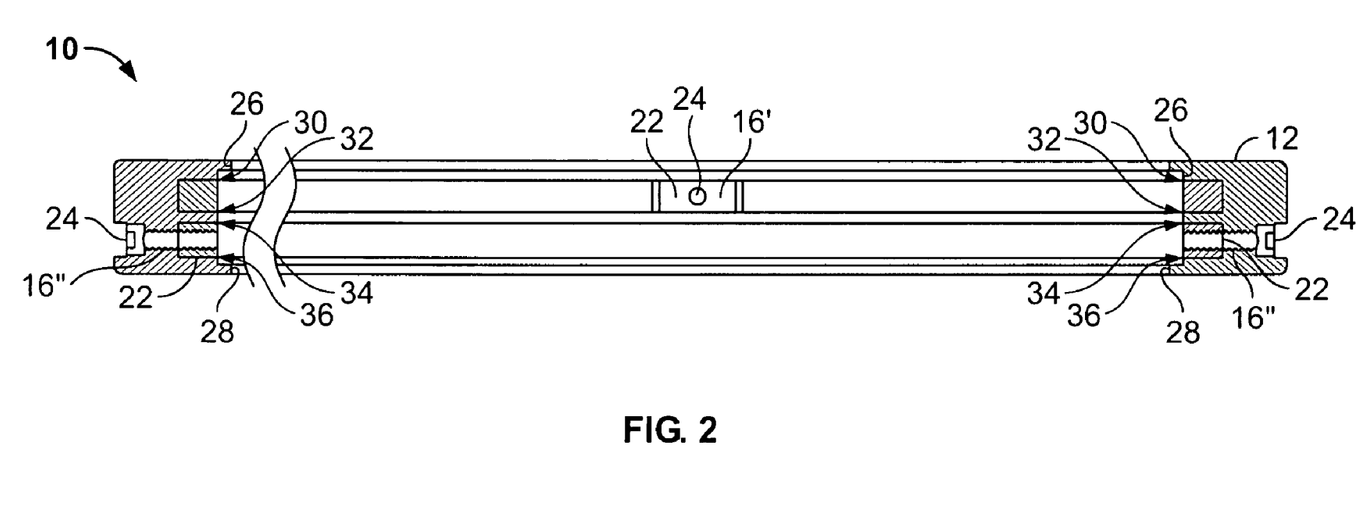
FIG. 2 illustrates a cross-sectional view of a charge-dissipating assembly through line 2-2 of FIG. 1.

FIG. 2 illustrates a cross-sectional view of the electrical charge-dissipating assembly 10 through line 2-2 of FIG. 1. As shown in FIG. 2, the electrical charge-dissipating assembly 10 includes rows of grounding fibers 26 and 28. The grounding fibers 26 and 28 may be coated with a thermoplastic material, such an electrical cable. The grounding fibers 26 and 28 may form a brush assembly, such as shown and described in U.S. Patent Application Publication No. 2004/0233592, assigned to Illinois Tool Works, Inc. (the "'592 publication"), which is hereby incorporated by reference in its entirety. The grounding fibers 26 may be formed from carbon fibers, stainless steel, conductive plastics such as acrylic or nylon fibers, or any other conductive fiber-type filament that can be provided with diameters sufficiently small to induce ionization when in the presence of an electrical field.

As shown in FIG. 2, the grounding fibers 26 are wound in a U-shape. The grounding fibers 26 and 28 are separate and distinct fibers wound and folded within the annular frame 12 to form four rows of grounding contact with respect to the rotatable shaft. That is, the grounding fiber 26 may be a contiguous piece or bundle of fiber material, such as a contiguous ring of fiber, that is wound within the annular frame 12 thereby forming two rows 30 and 32 of fiber. Similarly, the grounding fiber 28 may be a contiguous piece or bundle of fiber material that is wound within the annular frame 12 thereby forming two rows 34 and 36 of fiber. Thus, two pieces, or bundles, of fiber may be wound within the annular frame 12 to form four grounding rows 30, 32, 34, and 36. Alternatively, more or less fibers 26 and 28 may be used, such that more or less fiber rows are housed within the annular frame 12.

As shown in FIGS. 1 and 2, a first set of fiber clamps 16' abuts the top rows of grounding fibers 26, while a second set of fiber clamps 16" abut the bottom rows of grounding fibers 28. The clamping main bodies 22 of the fiber clamps 16 are urged inwardly by tightening the fasteners 24, thereby inwardly urging the rows of grounding fibers 26 and 28. The set of fiber clamps 16' is disposed along the annular frame 12 ninety degrees with respect to the set of fiber clamps 16", in order to provide uniform clamping of the grounding fibers 26 and 28 into the motor shaft (not shown in FIG. 1 and 2). Optionally, more or less fiber clamps 16 may be positioned within the annular frame 12.

Figure 3:
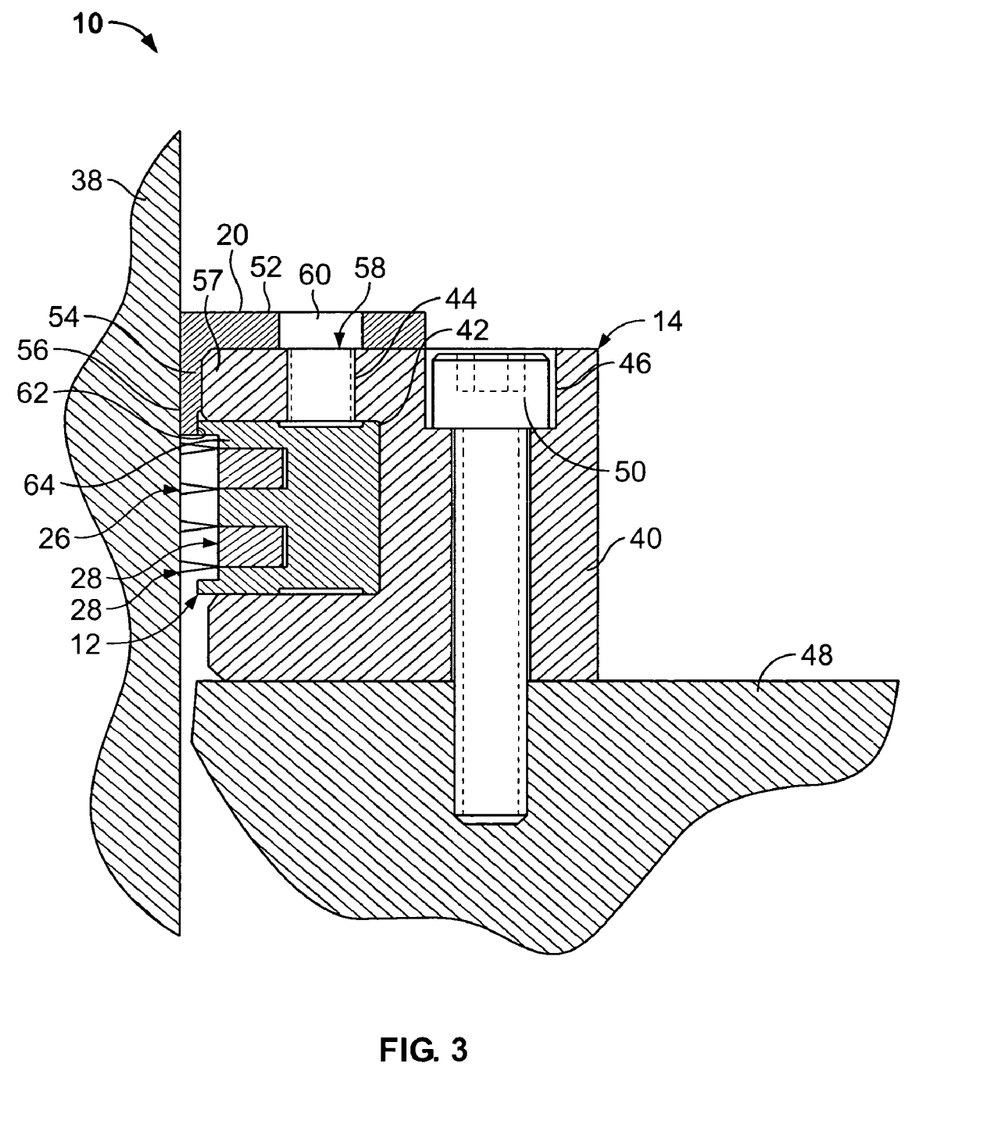
FIG. 3 illustrates a cross-sectional view of an annular frame positioned in a mounting bracket by an installation guide through line 3-3 of FIG. 1.

FIG. 3 illustrates a cross-sectional view of the annular frame 12 positioned in the mounting bracket 14 by the installation guide 20 through line 3-3 of FIG. 1. As shown in FIG. 3, the mounting bracket 14 includes a main body 40 having a frame channel 42, a frame fastener through hole 44, and a motor fastener through hole 46. The annular frame 12 may secure to the mounting bracket 14 within the frame channel 42 through an interference engagement. Alternatively, the annular frame may be configured to snapably, threadably, or otherwise removably secure within the frame channel 42. Optionally, the annular frame 12 may be integrally formed with the mounting bracket 14, or it may be glued, bonded, welded, or the like within the frame channel 42.

The mounting bracket 14 is secured to a motor housing 48 through a fastener 50, such as a screw, retained within the motor fastener through hole 46. Alternatively, the mounting bracket 14 may be an integral component of the motor housing 48.

In order to properly position the annular ring 12 with respect to the rotatable shaft 38, the installation guide 20 is used during an assembly process. The installation guide 20 includes a top plate 52 integrally formed with a spacer 54 having a tab 56 extending therefrom. The spacer 54 may be joined perpendicularly to the top plate 52. A passage 58 is formed through the top plate 52, and is configured to fit around a fastener head.

During the assembly process, the installation guide 20 is positioned over the mounting bracket 14 such that the passage 58 is aligned with the frame fastener through hole 44. A fastener 60 positioned within the frame fastener through hole 44 exerts a clamping force into the top of the annular frame 12, thereby clamping the annular frame 12 into the frame channel 42. The passage 58 fits around the head of the fastener 60.

When the passage 58 is aligned with the frame fastener through hole 44, the spacer 54 overlays an upper lateral surface 57 of the mounting bracket 14 such that the tab 56 abuts an edge 62 of an upper surface 64 of the annular frame 12. The electrical charge-dissipating assembly 10 is then positioned around the rotatable shaft 38 such that the spacer 54 is sandwiched between the rotatable shaft 38 and the edge 62 of an upper surface 64 of the mounting bracket 14. As such, the installation guide 20 acts to properly space or align the grounding fibers 26 and 28, which are secured within the annular frame 12, with respect to the rotatable shaft 38.

Figure 4:
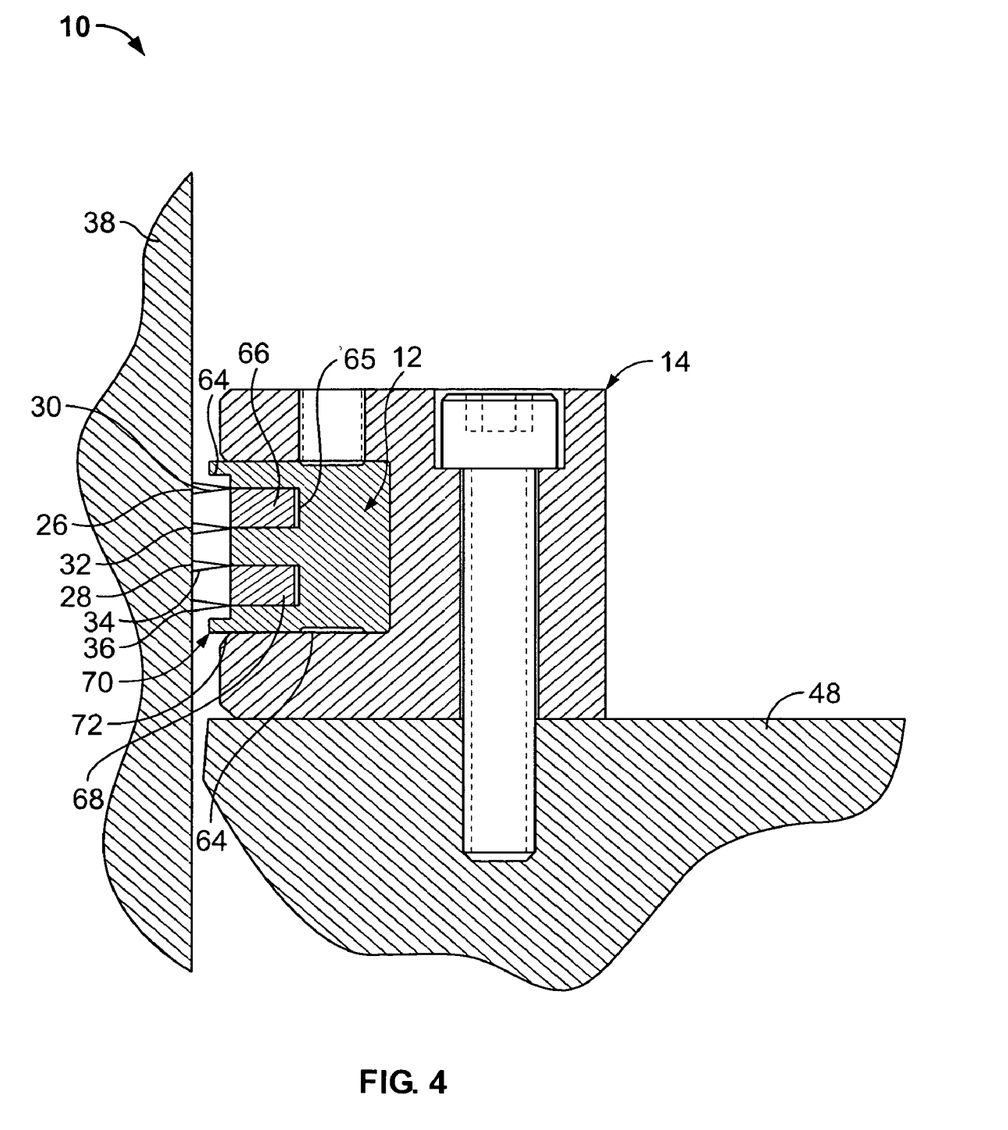
FIG. 4 illustrates a cross-sectional view of an annular frame positioned within a mounting bracket after an installation guide has been removed through line 4-4 of FIG. 1.

FIG. 4 illustrates a cross-sectional view of the annular frame 12 positioned within the mounting bracket 14 after the installation guide 20 (shown in FIGS. 1 and 3) has been removed through line 4-4 of FIG. 1. The installation guide 20 is removed after the assembly process and before operation of the motor or rotating shaft. That is, the installation guides 20 remain on the mounting brackets 14 while mounting holes on the motor housing 48 corresponding to the mounting brackets 14 are located. After the mounting brackets 14 are secured to the motor housing 48, the installation guides 20 may be removed.

Conductive holders 65 are positioned with the annular frame 12 and secure the ground fibers 26 and 28 within the annular frame 12. The conductive holders 65 may be formed of aluminum, for example. The grounding rows 30 and 32 are separated by a retainer 66 secured therebetween, while the grounding rows 34 and 36 are separated by a retainer 68 secured therebetween.

The rows 30 and 32 of the grounding fiber 26 and the rows 34 and 36 of the grounding fiber 28 may be in direct contact with the rotatable shaft 38, as a grounding brush, for direct transfer of electrical charge from the rotatable shaft 38 to the assembly 10. Optionally, the rows 30, 32, 34, and 36 may be minimally spaced from the rotatable shaft 38 such that, as an electrical field is generated by charges building on the rotatable shaft 38, an ionized field is created, allowing indirect transfer of charges from the rotatable shaft 38 to the rows 30 and 32 of the grounding fiber 26 and the rows 34 and 36 of the grounding fiber 28. Additionally, the rows 30, 32, 34, and 36 may be in contact with the rotatable shaft 38 when the rotatable shaft 38 is at rest or rotating at low velocities.

The grounding fibers 26 and 28 within the annular frame 12 are electrically connected to ground through the mounting brackets 14, which are in turn secured to the rotatable shaft or grounded motor housing 48. Charges that build on the rotatable shaft 38 are dissipated to ground through the electrical charge-dissipating assembly 10 allowing for the least resistant path to ground for the electrical charge to flow.

Figure 5:
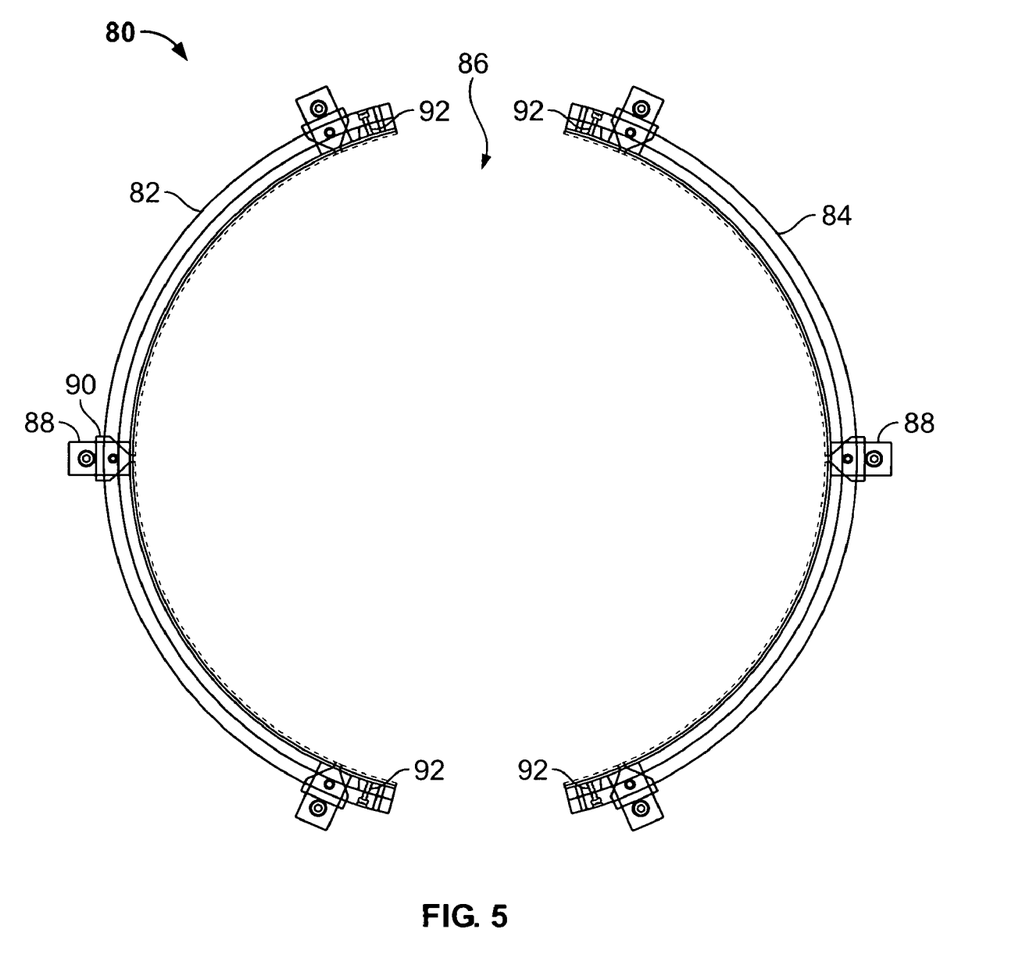
FIG. 5 illustrates a plan view of a charge-dissipating assembly, according to an embodiment of the present invention.

FIG. 5 illustrates a plan view of a charge-dissipating assembly 80, according to an embodiment of the present invention. The assembly 80 is a split-ring design comprising two semi-circular frame members 82 and 84 having a shaft opening 86 therebetween. Each frame member 82 and 84 includes mounting brackets 88, installation guides 90, and fiber clamps 92 similar to those described above with respect to FIGS. 1-4.

The assembly 80 is split in order to accommodate shafts having large diameters and/or obstructions. Additionally, because of its split-ring design, the assembly 80 may be retrofit to existing motors. For example, because of the split-ring design, the assembly 80 can be installed without sliding it over the shaft.

While the assembly 80 is shown having two frame members 82 and 84, the assembly 80 may alternatively be a single piece having an opening separating two prongs. Also, alternatively, the assembly 80 may include more or less mounting brackets 88, installation guides 90, and fiber clamps 92 than those shown.

Figure 6:
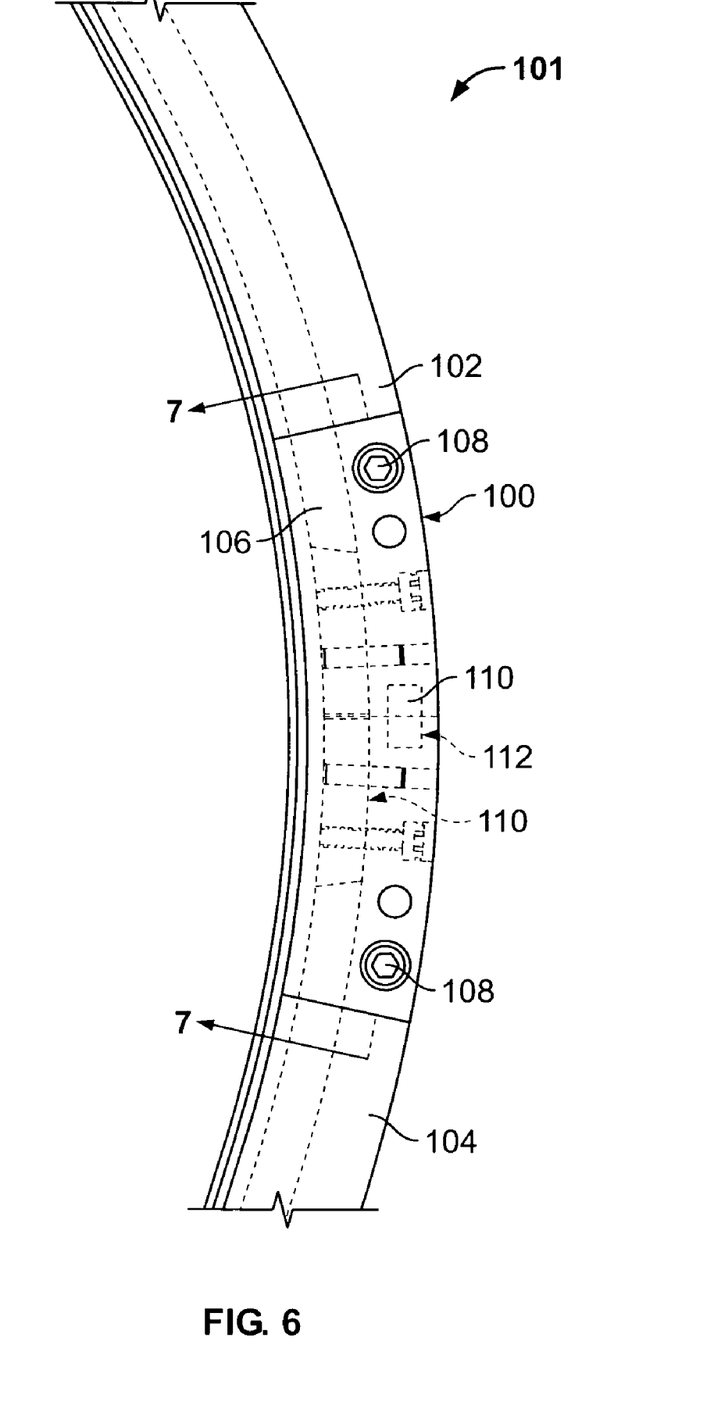
FIG. 6 illustrates a plan view of a frame joint of a charge-dissipating assembly according to an embodiment of the present invention.

FIG. 6 illustrates a plan view of a frame joint 100 of an electrical charge-dissipating assembly 101 according to an embodiment of the present invention. The frame joint 100 may be used to join free ends of a split ring assembly together, such as ends 102 and 104. The frame joint 100 includes a mounting plate 106 that overlays a portion of the end 102 and a portion of the end 104. Fasteners 108, such as screws or bolts, securely affix the mounting plate 106 to the ends 102 and 104. A dowel pin 110 extending from end 102 is positioned within a reciprocal opening 112 of the end 104. The dowel pin 110 assists in properly aligning the ends 102 and 104 with respect to one another before the mounting plate 106 is secured to the ends 102 and 104. Optionally, the end 104 may include the dowel pin 110, while end 102 includes the reciprocal opening 112.

Figure 7:
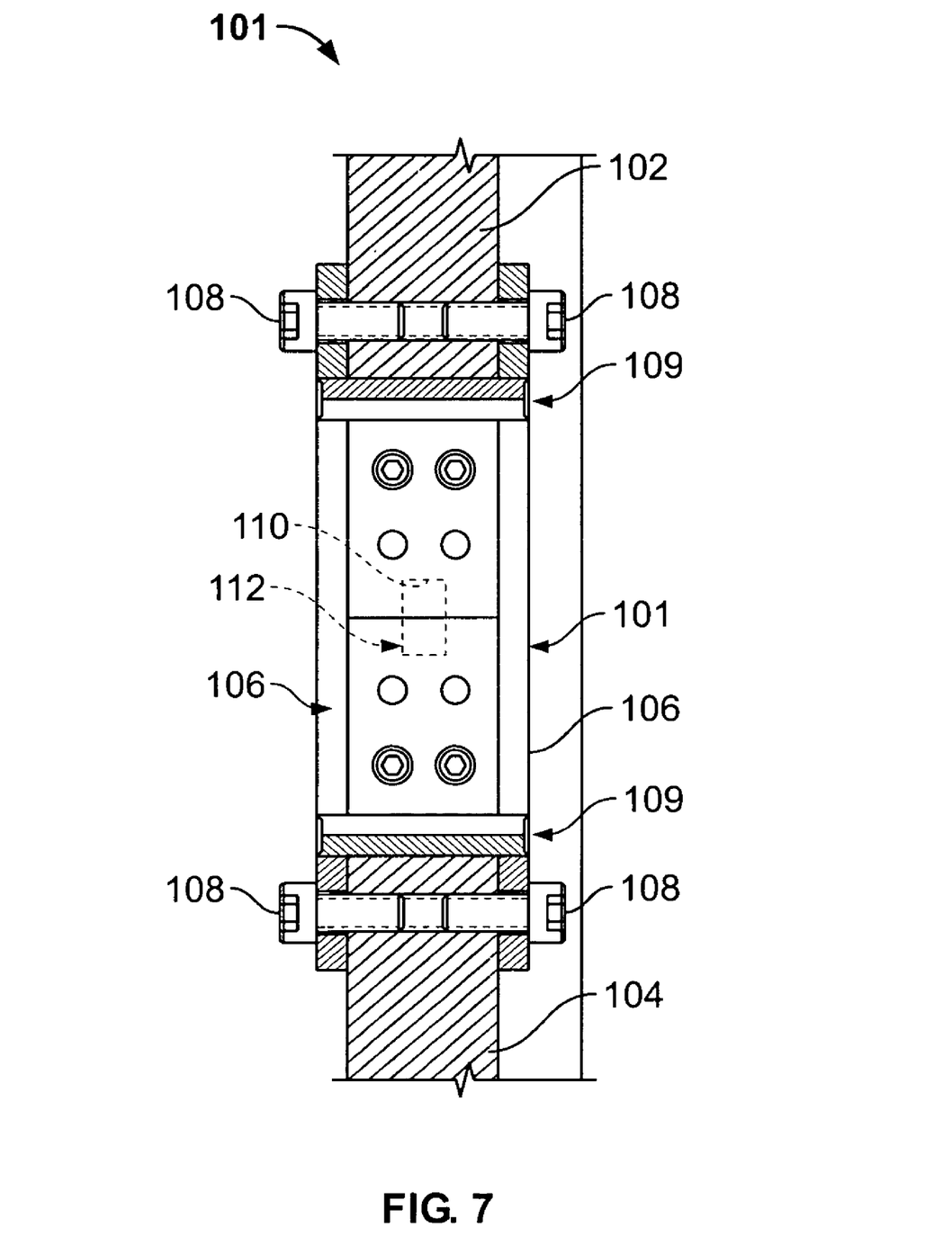
FIG. 7 illustrates a cross-sectional view of a charge-dissipating assembly through line 7-7 of FIG. 6.

FIG. 7 illustrates a cross-sectional view of the frame joint 100 of the electrical charge-dissipating assembly 101 through line 7-7 of FIG. 6. Two mounting plates 106 are secured to both sides of the ends 102 and 104. The fasteners 108 and dowel pins 109 secure the mounting plates 106 to the ends 102 and 104, thereby fixing the end 102 to the end 104.

Figure 8:
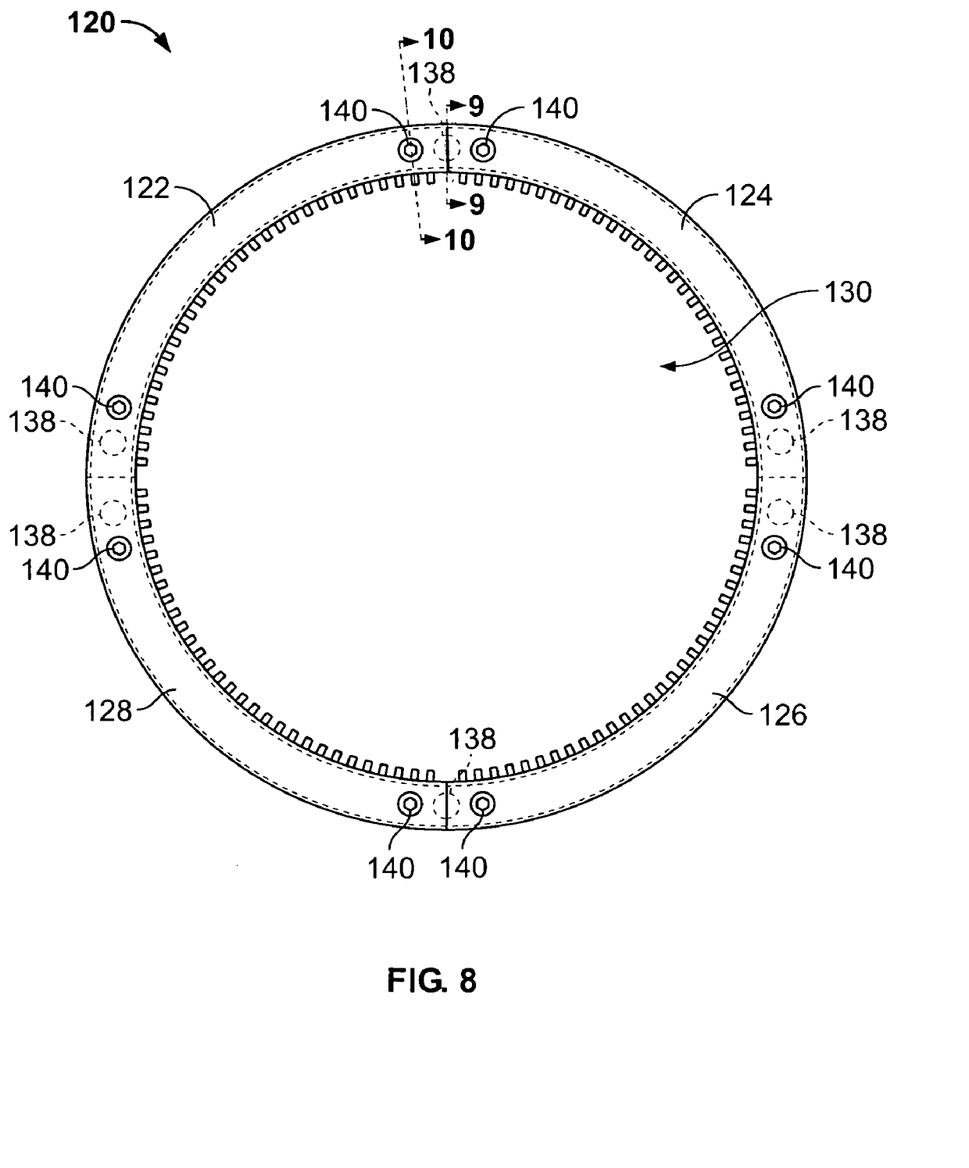
FIG. 8 illustrates a plan view of a charge-dissipating assembly according to an embodiment of the present invention.

FIG. 8 illustrates a plan view of a charge-dissipating assembly 120 according to an embodiment of the present invention. The assembly 120 is a split-ring design including four semi-circular frame members 122, 124, 126, and 128. Frame member 122 is secured to frame member 124, which is in turn secured to frame member 126, which is in turn secured to frame member 128, which is in turn secured to frame member 122, thereby forming a general ring shape. A shaft opening 130 is defined between the frame members 122, 124, 126, and 128. While four frame members 122, 124, 126, and 128 are shown, the assembly 120 may include more or less than four frame members. For example, the assembly 120 may include three, five, six, seven, . . . n members that form a ring-shaped assembly defining a shaft opening therebetween.

Figure 9:
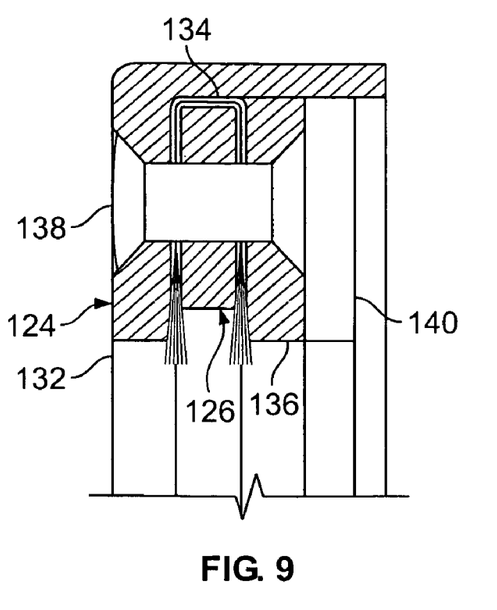
FIG. 9 illustrates a cross-sectional view of a charge-dissipating assembly through line 9-9 of FIG. 8.

FIG. 9 illustrates a cross-sectional view of the charge-dissipating assembly 120 through line 9-9 of FIG. 8. FIG. 9 shows a frame joint in which one frame member, such as frame member 124, is joined to another frame member, such as frame member 126. A fastener 138, such as a pin, screw or bolt, is secured within the assembly through a cup 132, an inner washer 134, and an outer washer 136. A retainer half washer 140 mounts to the face of the outer washer 136 and the cup 132.

Figure 10:
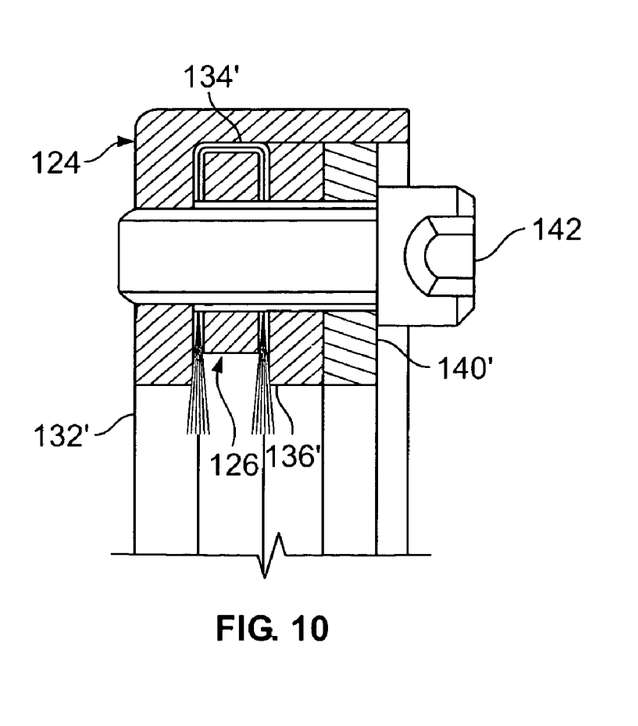
FIG. 10 illustrates a cross-sectional view of a charge-dissipating assembly through line 10-10 of FIG. 8.

FIG. 10 illustrates a cross-sectional view of the charge-dissipating assembly 120 through line 10-10 of FIG. 8. FIG. 10 shows a frame joint in which one frame member, such as frame member 124, is joined to another frame member, such as frame member 126. A fastener 142, such as a pin, screw or bolt, is secured within the assembly through a cup 132', an inner washer 134', and an outer washer 136'. A retainer half washer 140' mounts to the face of the outer washer 136' and the cup 132'

As shown in FIGS. 9 and 10, an end portion of one frame member, such as frame member 124, overlays a reciprocal mating end portion of an adjacent frame member, such as frame member 126. The end portions of the frame members are securely fastened to one another through the fasteners 138 and 142. Instead of separate fasteners, the end portions of the frame members may include integrally formed tabs and posts that are configured to snapably, latchably, or otherwise securely mate with integrally formed slots or channels formed in the end portions of adjacent frame members.

The assembly 120 is separable in order to accommodate shafts having large diameters and obstructions. Additionally, because of the separable nature of the assembly 120, it may be retrofit to existing shafts. For example, the assembly 120 may be installed to a shaft system without sliding it over the shaft.

The embodiments of the present invention shown in FIGS. 1-7 may be used with a variety of variable frequency drives, which control the speed of an AC electric motor by controlling the frequency of the voltage at the motor. Embodiments of the present invention may be used in various types of motor systems, such as those used with pumps, fans, machine tools and many others.

While the embodiments above with respect to FIGS. 1-7 show a single charge-dissipating assembly positioned around a motor shaft, additional single charge-dissipating assemblies may also be used. For example, two charge-dissipating assemblies may be positioned around a single motor shaft.

Thus, embodiments of the present invention provide an efficient grounding system that may be used effectively for a prolonged period of time, requiring minimal service or replacement. Embodiments of the present invention provide a system that mitigates electrical current through the shaft bearings of a motor, thereby preventing bearing damage and failure.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A system for dissipating charges that build on a rotatable shaft, the system comprising:
    a frame defining a central opening, wherein the rotatable shaft is positioned with said central opening;
    a first grounding fiber secured within said frame;
    a fiber clamp positioned within said frame, said fiber clamp acting to urge said first grounding fiber toward said central opening;
    a mounting bracket having a frame mounting channel, wherein a portion of said frame is securely retained within said frame mounting channel, said mounting bracket being configured to securely mount to the electrically grounded motor housing; and
    an installation guide positioned on said mounting bracket during an assembly process, said installation guide configured to properly align said frame and said first grounding fiber relative to the rotatable motor shaft, and wherein said installation guide is removed after said mounting bracket is securely mounted to the electrically grounded motor housing.

2. The system of claim 1, wherein the rotatable shaft extends from an electrically-grounded motor housing.

3. The system of claim 1, wherein the rotatable shaft is conductively linked to at least one of a wind turbine blade and a generator turbine.

4. The system of claim 1, wherein said first grounding fiber is a contiguous piece of material wrapped within said frame to form first and second grounding rows.

5. The system of claim 4, further comprising a second grounding fiber secured within said frame, said second grounding fiber being a contiguous piece of material wrapped within said frame to form an even number of grounding rows.

6. The system of claim 1, wherein said frame is a single annular frame.

7. The system of claim 1, wherein said frame is a split frame having two prongs joined together, wherein said two prongs have free ends separated by an opening.

8. The system of claim 1, wherein said frame is a split frame having two separate and distinct frame members.

9. The system of claim 1, wherein said frame is a split frame having free ends joined together by frame joints.

10. The system of claim 1, wherein said frame comprises at least three frame members joined together to form said frame.

11. A charge-dissipating assembly for dissipating charges that build on a rotatable shaft extending from an electrically grounded motor housing, the assembly comprising:
    a frame defining a central opening, wherein the rotatable shaft is positioned with said central opening;
    a first grounding fiber secured within said frame;
    a mounting bracket having a frame mounting channel, wherein a portion of said frame is securely retained within said frame mounting channel, said mounting bracket being configured to securely mount to the electrically grounded motor housing; and
    an installation guide positioned on said mounting bracket, said installation guide configured to properly align said frame and said first grounding fiber relative to the rotatable motor shaft, and wherein said installation guide is removed after said mounting bracket is securely mounted to the electrically grounded motor housing.

12. The assembly of claim 11, wherein said first grounding fiber is a contiguous piece of material wrapped within said frame to form first and second grounding rows.

13. The assembly of claim 12, further comprising a second grounding fiber secured within said frame, said second grounding fiber being a contiguous piece of material wrapped within said frame to form third and fourth grounding rows.

14. The assembly of claim 11, wherein said frame is a single annular frame.

15. The assembly of claim 11, wherein said frame is a split frame having two prongs joined together, wherein said two prongs have free ends separated by an opening.

16. The assembly of claim 11, wherein said frame is a split frame having two separate and distinct frame members.

17. The assembly of claim 11, wherein said frame is a split frame having free ends joined together by frame joints.

18. The system of claim 11, wherein said frame comprises at least three frame members joined together to form said frame.

19. An electric motor comprising:
a main motor housing, wherein said main motor housing is electrically grounded;
a rotatable motor shaft extending from said main motor housing; and
a charge-dissipating assembly comprising:
a frame defining a central opening, wherein said rotatable shaft is positioned with said central opening;
a plurality of grounding fibers secured within said frame;
a plurality of fiber clamps positioned within said frame, said plurality of fiber clamps acting to urge said plurality of grounding fibers toward said central opening;
a plurality of mounting brackets having frame mounting channels, wherein portions of said frame are securely retained within said frame mounting channels, said plurality of mounting brackets being configured to securely mount to said electrically grounded motor housing; and
a plurality of installation guides positioned on said plurality of mounting brackets, each of said plurality of installation guides being configured to properly align said frame and said plurality of grounding fibers relative to said rotatable motor shaft.

20. The electric motor of claim 19, wherein said plurality of installation guides are removed after said plurality of mounting brackets are securely mounted to said electrically grounded motor housing.

21. The electric motor of claim 19, wherein each of said plurality of grounding fibers is a contiguous piece of material wrapped within said frame to form a plurality of grounding rows.

22. The system of claim 19, wherein said frame is a single annular frame.

23. The system of claim 19, wherein said frame is a split frame having two prongs joined together, wherein said two prongs have free ends separated by an opening.

24. The system of claim 19, wherein said frame is a split frame having two separate and distinct frame members.

25. The system of claim 19, wherein said frame is a split frame having free ends joined together by frame joints.

26. The system of claim 19, wherein said plurality of grounding fibers contact said rotatable motor shaft.

27. The system of claim 19, wherein said frame comprises at least three frame members joined together to form said frame.

* * * * *